United States Patent [19]

Grimm

[11] 4,452,936

[45] Jun. 5, 1984

[54] OLIGOMERIZED ACIDS AS SCORCH INHIBITORS FOR CARBOXYLATED RUBBERS

[75] Inventor: Donald C. Grimm, Tallmadge, Ohio

[73] Assignee: The Goodyear Tire & Rubber Company, Akron, Ohio

[21] Appl. No.: 379,250

[22] Filed: May 17, 1982

[51] Int. Cl.³ .............................................. C08K 5/09
[52] U.S. Cl. ................................... 524/322; 524/321; 524/432
[58] Field of Search ...................... 524/322, 432, 321

[56] References Cited

U.S. PATENT DOCUMENTS

| | | | |
|---|---|---|---|
| 3,000,851 | 9/1961 | Schweitzer | 524/384 |
| 3,220,968 | 11/1965 | Dollhausen et al. | 524/345 |
| 3,880,821 | 4/1975 | Feniak | 524/322 |
| 4,191,671 | 3/1980 | Kataoka et al. | 524/322 |

Primary Examiner—Joseph L. Schofer
Assistant Examiner—N. Sarofim
Attorney, Agent, or Firm—Alvin T. Rockhill

[57] ABSTRACT

Scorch (the premature cross-linking of an elastomer) is a problem that is often encountered in carboxylated rubbers in the presence of metal oxides which are used as cross-linking agents. Oligomerized fatty acids can be distributed throughout a carboxylated rubber to improve the scorch resistance of the resulting carboxylated rubber composition without significantly affecting the cure rate of that rubber composition. This invention discloses a process for improving the scorch resistance of a carboxylated rubber composition comprising distributing throughout a carboxylated rubber at least one oligomerized fatty acid to improve the scorch safety of said rubber composition without significantly affecting the cure rate of said rubber composition.

14 Claims, No Drawings

OLIGOMERIZED ACIDS AS SCORCH INHIBITORS FOR CARBOXYLATED RUBBERS

BACKGROUND OF THE INVENTION

Carboxylated rubbers (rubbers containing carboxyl groups in their polymer chain) are useful for many purposes. Carboxylic nitrile rubber (XNBR) is a terpolymer of butadiene, acrylonitrile, and methacrylic acid. This carboxyl modification of nitrile rubber (NBR) produces a material that has outstanding abrasion resistance. Metal oxide vulcanizates of carboxylic elastomers also have unusually high tensile strengths, superior ozone resistance, and elevated modulus values. Such carboxyl modification of a rubber typically involves the addition of about 0.75 percent to 15 percent by weight of an unsaturated carboxylic acid of the acrylic acid type to the monomer charge composition of the carboxylic rubber being synthesized.

These carboxylated elastomers can be vulcanized in a manner analogous to their uncarboxylated counterpart utilizing a sulfur curing agent. In addition to this, if a polyvalent radical and particularly divalent metals are available in the vulcanization recipe, the carboxyl groups in the polymer chain can take part in this cross-linking reaction. This cross-linking reaction is fast in the presence of divalent metals and scorch problems are often encountered. Even at room temperature, carboxylated rubbers will often cure in 48 hours or less in the presence of zinc oxide when uninhibited. Since scorch (the premature cross-linking of an elastomer) can render a rubber completely unworkable, it is necessary to control this cross-linking reaction between carboxyl groups on the polymer chain.

This invention discloses the use of oligomerized fatty acids as agents to greatly improve the scorch safety (resistance) of carboxylated rubbers. These oligomers of fatty acids are prepared by the oligomerization of unsaturated fatty acids containing from 12 to 25 carbon atoms such as oleic acid, linoleic acid, and linolenic acid. An oligomer is a polymer comprising 2, 3, or 4 monomer units. The monomer units used in the oligomerized fatty acids of this invention are unsaturated fatty acids containing from 12 to 25 carbon atoms. Using this invention, the excellent scorch resistance that is obtained while using zinc peroxide as the curing agent can be achieved while using zinc oxide as the curing agent.

THE INVENTION

Oligomers of fatty acids can be used as scorch inhibitors in any carboxylated rubber. This invention discloses an improved scorch resistant carboxylated rubber composition comprising: a carboxylated rubber and at least one oligomerized fatty acid which is distributed throughout said carboxylated rubber composition to improve the scorch safety of said rubber composition without significantly affecting the cure rate of said rubber composition.

This invention also discloses a process for improving the scorch resistance of a carboxylated rubber composition comprising distributing through a carboxylated rubber at least one oligomerized fatty acid to improve the scorch safety of said rubber composition without significantly affecting the cure rate of said rubber composition.

It further discloses a process for improving the scorch resistance of a carboxylated rubber composition comprising distributing at least one saponified oligomerized fatty acid throughout a carboxylated rubber latex which is at a pH of at least 4 and coagulating said latex to separate said rubber composition containing at least one oligomerized fatty acid from an aqueous phase. The actual preparation, properties and structures of dimerized $C_{18}$ fatty acids are described in U.S. Pat. No. 2,347,562 and Cowan, John C. and Wheeler, Donald H., "Linear Superpolyesters from Dilinoleic Acid," *The Journal of the American Chemical Society*, vol. 66, pp. 84–88 (1944), both of which are incorporated herein by reference. Oleic acid, linolenic acid are generally used as the monomers in such oligomerizations.

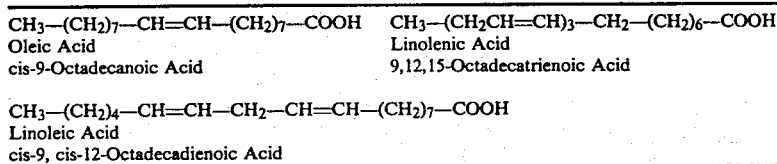

$CH_3-(CH_2)_7-CH=CH-(CH_2)_7-COOH$
Oleic Acid
cis-9-Octadecanoic Acid $CH_3-(CH_2CH=CH)_3-CH_2-(CH_2)_6-COOH$
Linolenic Acid
9,12,15-Octadecatrienoic Acid $CH_3-(CH_2)_4-CH=CH-CH_2-CH=CH-(CH_2)_7-COOH$
Linoleic Acid
cis-9, cis-12-Octadecadienoic Acid Several different grades of oligomerized $C_{18}$ fatty acids are available commercially which vary in monomer dimer and trimer content. For example, oligomerized acids are available from Emery Industries, Inc. under the trade name, Empol ™. Empol 1010 contains 97% dimer acids and 3% trimer acids. Empol 1014 contains 95% dimer acids, 4% trimer acids, and 1% of the fatty acid monomers. Empol 1016 contains 87% dimer acids, 13% trimer acids, and a trace of monomer. Empol 1018 contains 83% trimer acids, 17% dimer acids and a trace of monomer. Empol 1022 contains 75% dimer acids, 22% trimer acids, and 3% monomer. Empol 1024 contains 25% trimer acids, 75% dimer acids, and a trace of monomer. Empol 1041 contains 90% trimer acids and 10% dimer acids. Empol 1052 contains 40% dimer acids and 60% trimer and polybasic acids. Trimerized $C_{18}$ fatty acids have a molecular weight of about 850, contain 54 carbon atoms, and have 3 carboxyl groups. Any combination of oligomers of fatty acids can be mixed throughout a carboxylated rubber to provide improved scorch safety for that rubber composition without significantly affecting its cure rate. On a molar basis or when compared on a weight basis trimer acids are more effective than dimer acids as scorch inhibitors. Fatty acids containing 18 carbon atoms which are dimerized and trimerized into $C_{36}$ and $C_{54}$ dimer and trimer acids will normally be used as scorch inhibitors since they are readily commercially available. However, the scope of dimerized and trimerized fatty acids useful as scorch inhibitors is not limited to dimerized and trimerized $C_{18}$ fatty acids, since undoubtedly $C_{12}$ or $C_{25}$ fatty acids which have been dimerized and/or trimerized will also provide scorch resistance to a greater or less extent. Fatty acids containing from 12 to 25 carbon atoms which are oligomerized will be useful as scorch inhibitors for carboxylated rubbers. The oligomerization of unsaturated fatty acids containing varying numbers of carbon atoms will produce oligomers that have good properties as scorch inhibitors. For example, the codimerization of a $C_{12}$ fatty acid with a $C_{25}$ fatty acid will produce a $C_{37}$ dimerized fatty acid that will be a good scorch inhibitor. Any combination of any or all of the aforementioned types of oligomers of fatty acids can be used to provide excellent scorch safety when distributed throughout a carboxylated rubber. However, it is generally preferred to use oligomerized fatty acids that are comprised predominantly of trimer acids (90% or more by weight) and minor amounts of dimer acids, polybasic acids, and monomeric acids.

Carboxylated rubbers (elastomers) contain chain linkages derived from unsaturated carboxylic acids of the acrylic acid type (unsaturated carboxylic acid monomers). Some representative examples of unsaturated carboxylic acids of the acrylic acid type include acrylic acid, methacrylic acid, sorbic acid, $\beta$-acryloxypropanoic acid, ethacrylic acid, 2-ethyl-3-propyl acrylic acid, vinyl acrylic acid, cinnamic acid, maleic acid, fumaric acid, and the like. The rubbers in which dimeric and trimeric fatty acids are useful as scorch inhibitors generally contained from about 0.75 percent to 15 percent by weight chain linkages (repeat units) which are derived from unsaturated carboxylic acid monomers.

These carboxylic rubbers can be synthesized using any conventional polymerization technique. Emulsion polymerization of carboxylated elastomers is generally preferred and is used almost exclusively in industrial production. This type of a synthesis generally utilizes a charge composition comprising water, monomers, an initiator, and an emulsifier (soap). Such polymerizations can be run over a very wide temperature range from about 0° C. to as high as 100° C. It is more preferred for these polymerizations to be run at a temperature from about 5° C. to 60° C.

The amount of carboxylic acid monomer (unsaturated carboxylic acid of the acrylic acid type) incorporated in a carboxylated rubber may be varied over a wide range. The monomer charge ratio between the carboxylic monomer and the comonomers employed in a polymerization may also be varied over a very wide range. A typical monomer charge composition for a carboxylated nitrile rubber is 67 percent butadiene, 26 percent acrylonitrile, and 7 percent methacrylic acid (percentages are by weight). Some other monomers that may be copolymerized with a carboxylic monomer to form carboxylated rubbers include styrene; isoprene; vinylidene monomers having one or more terminal

groups; vinyl aromatic such as $\beta$-methylstyrene, bromostyrene, chlorostyrene, fluorostyrene, vinylphenol, 3-hydroxy-4-methoxystyrene, vinylanisole, $\beta$-nitrostyrene, and the like; $\alpha$-olefins such as ethylene; vinyl halides, such as vinylbromide, chloroethene (vinylchloride), vinylfluoride, vinyliodide, 1,2-dibromoethane, 1,1-dichloroethylene (vinylidene chloride), 1,2-dichloroethylene, and the like; vinyl esters such as vinyl acetate; $\alpha,\beta$-olefinically unsaturated nitriles, such as methacrylonitrile; $\alpha,\beta$-olefinically unsaturated amides such as acrylamide, N-methyl acrylamide, N-t-butyl acrylamide, N-cyclohexyl acrylamide, diacetone acrylamide, methacrylamide, N-ethyl methacrylamide, and the like; $\alpha,\beta$-olefinically unsaturated N-alkylol amides having the general structural formula:

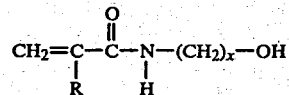

wherein R is a hydrogen atom or an alkyl group containing from 1 to 4 carbon atoms and x is an integer from 1 to 4 inclusive such as N-methylol acrylamide, N-ethylol acrylamide, N-propylol acrylamide, N-methylol methacrylamide, N-ethylol methacrylamide, and the like; vinyl pyridine; n-octyl methacrylate, dodecyl methacrylate, methylethacrylate, and ethyl ethacrylate; haloalkyl acrylates such as chloropropyl acrylate; methacrylates; hydroxyethylacrylate; and polyfunctional compounds such as ethylene glycol dimethacrylate, diethylene glycol diacrylate, divinylbenzene, methylene-bis-acrylamide, and the like.

In the polymerization of unsaturated carboxylic acids of the acrylic acid type with one or more of the above-mentioned monomers, there can be competing or side reactions which take place. Therefore, the choice of reactants, process conditions, order of addition of reactants and the like, should be selected in order to produce a useful rubber containing carboxyl groups. The monomers employed and monomer ratios used in the charge composition for the polymerization should be selected in a manner that will produce a carboxylated elastomer. It should be noted that many combinations of the above-mentioned monomers will result in the polymerization of a nonelastomeric polymer. The carboxyl modified polymers which are generally preferred include carboxylated nitrile rubber, which is a terpolymer of butadiene, acrylonitrile and methacrylic acid; terpolymers of methacrylic acid, styrene, and butadiene; copolymers of methacrylic acid and butadiene; copolymers of methacrylic acid and isoprene; terpolymers of acrylic acid, acrylonitrile, and butadiene; and terpolymers of methacrylic acid, vinylidene chloride, and butadiene.

The emulsifiers used in the polymerization of such polymers may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization.

Among the anionic emulsifiers that can be employed in emulsion polymerizations are fatty acids and their alkali metal soaps such as caprylic acid, capric acid, pelargonic acid, lauric acid, undecylic acid, myristic acid, palmitic acid, margaric acid, stearic acid, arachidic acid, and the like; amine soaps of fatty acids such as those formed from ammonia, mono- and dialkyl amines, substituted hydrazines, guanidine, and various low molecular weight diamines; chain-substituted derivatives of fatty acids such as those having alkyl substituents; naphthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester, or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC—CH_2—SO_3H$, wherein R is an alkyl group having from 1 to 20 carbon atoms such as dialkyl sulfosuccinates; ester salts with the general formula:

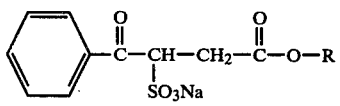

wherein R is an alkyl group having from 1 to 20 carbon atoms; alkaryl sulfonates in which the alkyl groups contain preferably from 10 to 20 carbon atoms, e.g. dodecylbenzenesulfonates, such as sodium dodecylbenzenesulfonate; alkyl phenol sulfonates; sulfonic acids and their salts such as acids with the formula $RSO_3Na$, wherein R is an alkyl and the like; sulfonamides; sulfamido methylenesulfonic acids; rosin acids and their soaps; sulfonated derivatives of rosin and rosin oil; and lignin sulfonates, and the like.

Rosin acid soap has been used with good success at a concentration of about 5 percent by weight in the initial charge composition used in the synthesis of carboxylated elastomers. Of rosin acids, about 90 percent are isometric with abietic acid and the other 10 percent is a mixture of dehydro abietic acid and dihydro abietic acid.

The polymerization of these carboxylated rubbers may be initiated using free radical catalysts, ultraviolet light, or radiation. To insure a satisfactory polymerization rate, uniformity, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Cumene hydroperoxide can be used as an initiator to obtain very good results in the polymerization of carboxylated nitrile rubber.

The emulsion polymerization styrene used in the synthesis of carboxylated rubbers can be treated at the desired degree of conversion with shortstopping agents, such as hydroquinone. Typical shortstopping agents will not interfere with the action of the oligomerized fatty acids as scorch inhibitors. Typical stabilizing agents and standard antioxidants can also be added to the emulsion of a carboxylated rubber without interfering with the action of the oligomerized fatty acids as scorch inhibitors. The carboxylated rubber composition of this invention can also contain, in addition to the carboxylated rubber and oligomerized fatty acids, other unsaturated rubbers and conventional compounding ingredients such as carbon black, other fillers, oils, waxes, antioxidants, and other processing aids.

After the emulsion polymerization has been completed, most conventional coagulating techniques for carboxylated rubbers can be employed if the oligomerized fatty acids are added to the rubber after coagulation. A review of coagulation techniques for nitrile rubbers is presented in Hofmann, Werner "Nitrile Rubber", Rubber Chemistry and Technology, vol. 37, no. 2, part 2 (April–June 1964), pp. 94–96, which is incorporated herein by reference. Many of these coagulation techniques will be useful in carboxylated nitrile rubbers. Normally such latexes are coagulated with reagents which insure the preservation of the carboxyl groups of the elastomers as acidic moieties. Coagulation with acid or blends of salts with acids is usually very satisfactory. For example, sulfuric acid, hydrochloric acid, blends of sodium chloride with sulfuric acid, and blends of hydrochloric acids with methanol are very effective as coagulating agents for carboxylated rubber emulsions. Calcium chloride solutions which are free of calcium hydroxide have also been used as coagulants with great success.

After coagulation washing may be employed to remove excess soap and/or electrolyte from the carboxylated rubber. Sometimes washing is also useful in adjusting the pH of the carboxylated elastomer that has been synthesized. After washing, if it is desired, the elastomer can be dewatered. If it is desirable to do so, the carboxylated rubber can also be dried and baled after dewatering using conventional techniques.

The properties of vulcanized nitrile rubbers depend to a great extent upon what vulcanization systems are used in their compounding. A summary of vulcanization systems for nitrile rubbers is given in Hofmann, W., "Nitrile Rubber". Rubber Chemistry and Technology, vol. 37, no. 2, part 2 (April–June 1964), pp. 166-167, 184-187, and 196-197, which is incorporated herein by reference. Carboxylated nitrile rubbers can be crosslinked with reagents which are bivalent or polyvalent which react with carboxyl groups. Examples are the oxides or hydroxides of polyvalent metals such as Zn, Ca, Be, Al, Ni, Cr, Mn, Sn, etc.

Normally, a metaloxide, usually zinc oxide, is mixed into a carboxylated rubber after it has been dried and baled. Usually from about 0.5 to 10 parts of the metal oxide per hundred parts rubber (phr) is employed. Excellent results are obtained using about 5 phr of zinc oxide. This process of mixing the zinc oxide into the rubber is usually carried out by utilizing a Banbury mixer; however, any other procedure that will adequately mix the zinc oxide with the carboxylated rubber can also be employed. Usually, zinc oxide is employed in combination with sulphur or a sulphur compound vulcanization agent in order to cure (vulcanize) the rubber. The rubber is vulcanized by heating for a period of time.

Normally, it is advantageous to minimize the time period between the point when the zinc oxide is added and the time at which the carboxylated rubber will be vulcanized (cross-linked). By minimizing this time period the amount of time in which spontaneous cross-linking between carboxyl groups can occur is minimized. Since unwanted cross-linking (scorch) often occurs in processing equipment (sometimes due to heat build-up) before it is desired the time at which the metal oxide is added is not a total solution to the problem.

By distributing (mixing) oligomers of fatty acids throughout a carboxylated rubber a scorch resistant carboxylic rubber composition is produced with the problem of premature cross-linking (scorch) being greatly reduced without significantly affecting the cure rate of the rubber composition. These oligomerized acids can be mixed into dried rubber using any procedure that will result in a thorough mixing. When the mixing is done in the dry state the dry carboxylated rubber and the oligomerized fatty acids are mixed by a rubber compounding means, such as a Banbury mixer or on a rubber mill, under conditions well-known in the art and normally used for mixing such carboxylated rubbers with compounding ingredients. The oligomerized fatty acids can be mixed with the carboxylated rubber as a separate step in the compounding process or may be mixed together with other compounding ingredients. This process of distributing an oligomerized fatty acid throughout a carboxylated rubber results in the formation of a scorch resistant carboxylated rubber composition without significantly changing the cure properties of the carboxylated rubber. Good results have been obtained by mixing dimeric and trimeric fatty acids into dried rubber with a Banbury mixer.

Oligomerized fatty acids can also be mixed into the emulsion of a carboxylated rubber (prior to coagulation). Such an addition prior to coagulation results in scorch resistance that is generally as good as that obtained by the addition of these agents to the dried rubber (via the Banbury mixer). However, if this technique is employed it is imperative that certain precautions be taken in order to attain the benefits of these fatty acids as scorch inhibitors. For example, most conventional emulsification techniques would result in the separation of these fatty acids from the latex and the loss of their benefits as scorch inhibitors in the dried rubber.

Oligomerized fatty acids are water insoluble materials. Thus, they must be saponified with a base to become soluble in water or in the rubber emulsion (latex). These fatty acids can be readily saponified by reacting them with bases such as aqueous potassium, sodium, or ammonium hydroxide to yield the water-soluble salt of these oligomerized fatty acids. These salts can then be further reacted with other bases, for example, calcium chloride to yield the calcium salt of these fatty acids.

The acidic nature of the latex of these carboxylated rubbers does pose a problem. The pH of a typical carboxylated rubber latex is 3.0 to 4.0. At this pH, saponified oligomerized fatty acids are only marginally soluble in the acidic latex. At a low pH in this range these saponified fatty acids are converted to free acids. Being insoluble in water, these oligomerized fatty acids thus separate from the latex. After this separation these fatty acids are no longer available for incorporation into the carboxylated rubber. Thus, unless measures are taken to prevent this conversion of saponified fatty acids into free acids they will not be incorporated into the carboxylated rubber to form a scorch resistant carboxylated rubber composition.

The preferred mode of incorporating oligomerized fatty acids into a carboxylated rubber is to add them to the latex in a saponified form taking measures to preserve this saponified structure. This is done by raising the pH of the latex above 4 by the addition of a base such as ammonium hydroxide, sodium hydroxide, or potassium hydroxide. Additionally, it is preferred to add these saponified fatty acids as a post-stabilizer to the latex rather than as a component of the reaction mixture used in the polymerization. This minimizes the time during which these saponified fatty acids can separate from the latex. These saponified acids can be added to the latex just before coagulation if sufficient time is allowed for proper mixing to result.

The successful coagulation of a carboxylated rubber containing these fatty acids can be achieved by the addition of various coagulating agents which will separate the carboxylated rubber and oligomerized fatty acid from the aqueous phase. This coagulation will result in the conversion of the saponified oligomerized fatty acids to free acids which are insoluble in the aqueous phase but which will remain in the rubber. A common coagulant is the combination of a salt, (sodium chloride, potassium chloride, etc.) and sulfuric acid. Coagulants, such as aluminum sulfate, should not be employed due to their tendency to react with the carboxyl moieties in the rubber and to cause cross-linking. Calcium chloride, barium chloride and magnesium sulfate are examples of suitable divalent salts that may be used in coagulating these carboxylated rubbers. It is advantageous to employ materials classified as coagulation aids (high molecular weight polyelectrolytes) in the coagulation of a carboxylated rubber latex containing oligomerized fatty acids. The preferred coagulation aids are weak bases. It is well-known that strong bases such as tetraethylene pentamine will cause severe scorch problems in elastomers. Thus, the preferred coagulation aids useful in this invention are Nalco TM 108, (Nalco Chemical Company), Daxad TM CP-1 (W. R. Grace and Company), and similar materials that are also weakly basic polyelectrolytes. The quantity of coagulant required will vary with the emulsifier, the amount of emulsifier used, the rubber being coagulated, and the type of coagulant being employed. Generally, the optimum type of coagulant, quantity of coagulant and coagulating conditions can be determined using a trial and error approach. Normally, it will be advantageous to use a coagulation aid in conjunction with other coagulating agents known to those skilled in the art.

Generally, the quantity of oligomerized fatty acids utilized as a scorch inhibitor in a carboxylated rubber composition will range from about 0.1 to about 7 phr. Preferably the amount of oligomerized fatty acid employed will range from 0.5 to 3 phr. For most carboxylated rubbers a concentration of oligomerized fatty acids of about 1.0 phr will provide very satisfactory scorch resistance for most applications. The optimum amount of oligomerized fatty acid needed will vary with the degree of carboxylation in the rubber being treated and with the processing conditions that will ultimately be employed in manufacturing the rubber into useful products.

DESCRIPTION OF THE PREFERRED EMBODIMENTS

This invention is illustrated by the following representative examples which are merely for the purpose of illustration and are not to be regarded as limiting the scope of the invention or the manner in which it may be practiced. Unless specifically indicated otherwise, parts and percentages are given by weight.

EXAMPLES 1 THROUGH 8

In order to demonstrate the superiority of dimeric and trimeric fatty acids as a scorch inhibitor when compared to other carboxylic acids and anhydrides a direct comparison between the scorch safety provided by them and numerous other carboxylic acids and anhydrides were experimentally made.

The structural formulae of the anhydrides and carboxylic acids used in these examples is shown below:

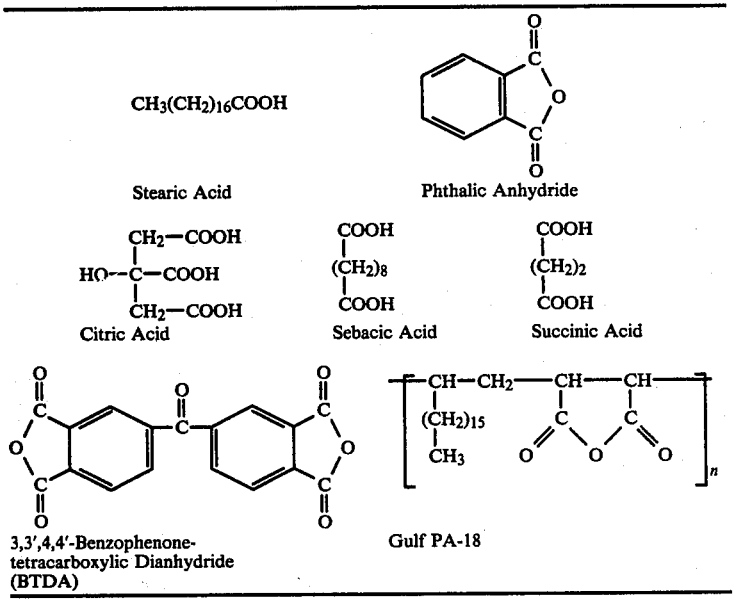

Gulf PA-18 is a polymerized anhydride with a molecular weight of approximately 50,000.

A carboxylated nitrile rubber was used for these examples. The charge composition used in the synthesis of this carboxylated nitrile rubber was 200 parts deionized water, 0.42 parts potassium hydroxide, 2.46 parts dodecylbenzene sulfonic acid, 0.3 parts sodium acid phosphate, 0.1 parts tetrasodium ethylene diamine tetraacetate, 7 parts methacrylic acid, 0.45 parts tertiary dodecylmercaptan, 27 parts acrylonitrile, 0.03 parts cumene hydroperoxide, 66 parts butadiene, 0.02 parts sodium formaldehyde sulfoxylate and 0.03 parts chelated ferrous sulfate. In the preparation of this charge composition the potassium hydroxide and dodecyl benzene sulfonic acid were premixed with 196 parts of deionized water and allowed to react for 15 minutes before adding the other components of the charge composition. The sodium formaldehyde sulfoxylate and chelated ferrous sulfate activators were premixed in a separate vessel in 4 parts of deionized water before they were added to the main reaction vessel and mixed with the other components in the charge composition.

This polymerization was run in a 75.7 liter reactor with agitation by two 15.2 cm Brumagim mixers at 300 rpm's (revolutions per minute). This polymerization was run at a temperature of 21° C. (70° F.). This temperature was maintained for 10 hours at which time the solid content of the emulsion had reached 27.7 percent. At this point, the reaction had reached approximately 80 percent conversion and 0.1 parts of sodium nitrite was added as a shortstop. The emulsion was then degassed to remove unpolymerized butadiene monomer that was present. This degassing was accomplished by applying 50.8 cm of vacuum to the emulsion for 10 hours.

Approximately 61.7 kilograms of latex was synthesized utilizing this polymerization recipe. 33.1 kilograms of this latex was mixed with emulsified Agerite Geltrol (2 active phr) and this blend was added to a solution containing 18.1 kgs of sodium chloride and 710 grams of concentrated sulfuric acid in 272.2 kg of water which was at a temperature of 60° C. (140° F.). As this solution was vigorously agitated coagulation of the carboxylated nitrile rubber occurred.

The rubber crumb was dipped out of this aqueous solution and dewatered with a dewatering screw down to about 10 percent water. The rubber was then oven dried to under 0.5 percent moisture content. 7.7 kilograms of dried rubber was produced by this process.

A Banbury mixer was employed to add 50 parts of carbon black, 5 parts of a plasticizer and 3 parts of various scorch inhibiting agents per 100 parts rubber (phr).

A Midget Banbury Mixer manufactured by Farrel Corporation was used for these examples. The Banbury was run at a speed of 84 rpm and the rubber was mixed (by itself) for an initial breakdown period of one minute. After this initial breakdown period the carbon black, plasticizer (dibutyl phthalate) and scorch inhibiting agent being tested were added and mixed for a period of 3 minutes. This technique made a very good mixture of the rubber, carbon black and scorch inhibiting agent being tested. Two parts tetramethyl thiuram disulfide, 1 part n-oxydiethylene benzothiazole-2-sulfinamide, 5 parts zinc oxide, and 0.3 parts sulfur per 100 parts rubber (phr) were mill mixed using a rolling bank into the rubber for one minute followed by 10 additional passes through the mill mixer.

These samples containing the different scorch inhibiting agents were then tested to determine their Mooney Scorch values. Mooney Scorch values for rubber samples containing each of the eight aforementioned scorch inhibiting agents to a 5 and 10 point rise in Mooney Scorch were determined at an operating temperature of 121° C. (250° F.) using ASTM Method D1077. The values that were determined for a 5 and 10 point rise in Mooney Scorch (designated as T-5 and T-10, respectively) are given in Table I.

TABLE I

| Example | Agent | T-5 (min.) | T-10 (min.) |
|---|---|---|---|
| 1 | Empol 1041 | 21.7 | 27.1 |
| 2 | Stearic Acid | 8.3 | 9.8 |
| 3 | Phthalic Anhydride | 2.3 | 2.9 |
| 4 | Citric Acid | 9.1 | 14.0 |
| 5 | Sebacic Acid | 6.2 | 7.9 |
| 6 | Succinic Anhydride | .6 | .8 |
| 7 | BTDA | 7.8 | 11.6 |
| 8 | PA-18 | 4.3 | 5.4 |

T-5 values of 15 minutes or greater are generally considered necessary for adequate scorch safety. As can be determined by examining Table I, Empol 1041 is then only agent in the example that provides greater than 15 minutes of Mooney Scorch protection. When Empol 1041 was used as a scorch inhibiting agent it took over 2½ times as long to reach a five point rise in Mooney Scorch than it did when any other agent was used as a scorch inhibitor. The time to a 10 point rise in Mooney Scorch when Empol 1041 was employed was almost 2 times as long as when any other scorch inhibiting agent tested was employed. It is readily apparent that this mixture of dimer and trimer acids is vastly superior to any other carboxylic acid or anhydride as a scorch inhibitor.

EXAMPLES 9 THROUGH 30

A further comparison was made between Empol acids and stearic acid using a commercially available carboxylic nitrile rubber. Krynac TM 221 (Polysar Ltd.) is the commercial rubber that was used in Examples 9 through 30. Krynac TM 221 is an emulsion polymerized copolymer of acrylonitrile, butadiene, and an acidic monomer (unsaturated carboxylic acid of the acrylic acid type). The Empol acids and stearic acids were employed at concentrations ranging from 0.1 phr to 7 phr and were incorporated into the Krynac 221 with a Banbury mixer using the same procedure that was discussed in Examples 1 through 8. After the addition of either an Empol acid or stearic acid the rubber was compounded using the same recipe and procedure as was employed in Examples 1 through 8.

These samples were tested for Mooney scorch (as in Examples 1 through 8) and also for rheometer cure properties at 325° F. (163° C.). The rheometer vulcanization properties were determined using a Monsanto oscillating disc rheometer. A description of oscillating disc rheometers can be found in the *Vanderbilt Rubber Handbook* edited by Robert O. Babbit (Norwalk, Conn., R. T. Vanderbilt Company, Inc., 1978), pp. 583–591. The use of this cure meter and standardized values read from the curve are specified in ASTM D-2084. A typical cure curve obtained on an oscillating disc rheometer is shown on page 588 of this edition of the Vanderbilt Rubber Handbook.

In such an oscillating disc rheometer compounded rubber samples are subjected to an oscillating shearing action of constant amplitude. The torque of the oscillating disc embedded in the stalk that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate. T'C 90 and T'C 95 values of under 20 minutes are normally preferred for carboxylated polymers vulcanized at 325° F. (163° C.).

Table II lists the examples using stearic acid as the scorch inhibitor. The cure curves that were obtained were used to determine a torque minimum ($M_L$), a torque maximum ($M_H$), minutes to 90% of the torque increase (T'C 90) and minutes to 95% of the torque increase (T'C 95). T'C 90 and T'C 95 are equivalent to T'90 and T'95 respectively.

TABLE II

| Example | Stearic Acid Used (phr) | Rheometer | | | | Mooney Scorch | |
|---|---|---|---|---|---|---|---|
| | | $M_L$ (N·m) | $M_H$ (N·m) | T'C 90 (min) | T'C 95 (Min) | T-5 (Min) | T-10 (Min) |
| 9 | 7.00 | 7.7 | 73.7 | 3.5 | 24.0 | 6.4 | 7.5 |
| 10 | 5.00 | 8.3 | 79.0 | 10.5 | 31.0 | 5.4 | 5.6 |
| 11 | 3.00 | 10.0 | 85.0 | 5.0 | 11.5 | 4.9 | 5.9 |
| 12 | 1.00 | 11.7 | 91.5 | 5.0 | 10.5 | 3.9 | 4.8 |
| 13 | 0.50 | 12.5 | 92.6 | 5.3 | 11.0 | 3.5 | 4.5 |
| 14 | 0.25 | 13.0 | 93.8 | 5.2 | 10.0 | 4.0 | 5.0 |
| 15 | 0.10 | 13.4 | 93.0 | 5.0 | 10.0 | 3.6 | 4.6 |
| 16 | 3.00 | 10.5 | 84.5 | 4.7 | 10.0 | 5.0 | 6.0 |

As can be determined by examining Table II, Mooney scorch improves very little with increasing concentrations of stearic acid. At a stearic acid concentration of 0.10 phr T-10 was 4.6 minutes and when the stearic acid level was increased to 7.0 phr there was only a minimal improvement in Mooney scorch with T-10 being determined to be 7.5 minutes. A stearic acid concentration of up to 3.0 phr apparently does not significantly affect the cure rate of the rubber and is exemplified by the fact that the T'C 90 and T'C 95 values do not vary greatly from a stearic acid concentration of 0.10 phr up to 3.00 phr. However, as can be determined by examining Examples 9 and 10, cure is severely retarded at stearic acid levels of 5.0 and 7.0 phr. This ineffectiveness of stearic acid as a scorch inhibitor and its tendency to retard cure is well-known. In many applications it is impossible to employ a sufficient amount of stearic acid to provide adequate scorch protection without causing an unacceptable reduction in the cure rate of the rubber.

In contrast to the performance of stearic acid, Empol 1041 not only greatly improves the Mooney scorch resistance of the carboxylated nitrile rubber but does not significantly retard its cure rate. This can be readily ascertained by examining Table III. It is apparent that mixtures of oligomerized fatty acids offer very substantial advantages over the use of stearic acid which is very widely employed by those skilled in the art as a scorch inhibitor.

TABLE III

| Example | Empol 1041 Used (phr) | Rheometer $M_L$ (N·m) | $M_H$ (N·m) | T'C 90 (Min) | T'C 95 (Min) | Mooney Scorch T-5 (Min) | T-10 (Min) |
|---|---|---|---|---|---|---|---|
| 17 | 7.00 | 7.7 | 80.0 | 6.7 | 10.0 | 14.4 | 18.4 |
| 18 | 5.00 | 8.4 | 81.3 | 6.8 | 10.0 | 12.5 | 16.6 |
| 19 | 3.00 | 9.4 | 86.2 | 6.3 | 10.5 | 14.0 | 18.2 |
| 20 | 1.00 | 11.0 | 87.4 | 6.5 | 15.0 | 13.7 | 17.7 |
| 21 | 0.50 | 11.4 | 86.2 | 5.2 | 7.5 | 12.5 | 16.3 |
| 22 | 0.25 | 12.2 | 87.3 | 4.8 | 8.0 | 9.5 | 11.8 |
| 23 | 0.10 | 13.8 | 88.4 | 4.3 | 7.0 | 5.0 | 11.2 |
| 24 | 3.00 | 10.0 | 84.4 | 7.0 | 11.0 | 13.5 | 18.0 |

Surprisingly, Empol 1041 provided the rubber with a faster cure rate than did the stearic acid at equal concentrations and provided the rubber with much better scorch resistance. This is vividly demonstrated when Example 13 is compared with Example 21. In Example 13, 0.50 phr of stearic acid was employed and in Example 21, 0.50 phr of Empol 1041 was employed. In Example 13, T-10 was only 4.5 minutes while in Example 21, T-10 was 16.3 minutes. The T-5 Mooney scorch resistance provided by Empol 1041 also compared very favorably with the scorch resistance provided by stearic acid at a concentration of 0.50 phr with the T-5 value in Example 21 being 12.5 minutes while the T-5 value found for stearic acid in Example 13 was only 3.5 minutes. Even at very low levels (0.10 phr) Empol 1041 provided greatly improved scorch resistance when compared with the scorch protection provided by stearic acid at equivalent concentration levels in the rubber. The T-10 value obtained in Example 23 using Empol 1041 as the scorch inhibiting is over twice as long as the T-10 value determined in Example 15 in which stearic acid was incorporated into the rubber as a scorch inhibiting agent.

Empol 1041 is greatly preferred over stearic acid as a scorch inhibiting agent since it offers very significant advantages. The ability of the Empol 1041 to retard the reaction of zinc oxide with the polymers carboxylic acid moieties at the 250° F. (121° C.) temperature of the Mooney scorch test is very significant because this temperature is commonly used during the processing of rubber into useful articles in industry. It is normally expected that materials which prevent scorch will drastically slow the curing process (vulcanization) of the rubber. Empol 1041 apparently violates this rule-of-thumb behavior for scorch inhibiting agents.

Table IV lists the scorch and rheometer cure properties for Empol 1010 which contains 97% dimer acids and 3% trimer acids.

TABLE IV

| Example | Empol 1010 Used (phr) | Rheometer $M_L$ (N·m) | $M_H$ (N·m) | T'C 90 (Min) | T'C 95 (Min) | Mooney Scorch T-5 (Min) | T-10 (Min) |
|---|---|---|---|---|---|---|---|
| 25 | 0.50 | 10.0 | 95.2 | 5.0 | 11.0 | 7.8 | 10.2 |
| 26 | 1.00 | 9.4 | 95.0 | 5.7 | 14.0 | 10.8 | 13.7 |
| 27 | 3.00 | 8.3 | 91.6 | 7.5 | 14.5 | 11.4 | 15.1 |

As can be seen in Example 27, when 3 phr of Empol 1010 was incorporated into Krynac TM 221, a T-10 scorch resistance of 15.1 minutes was observed. This is very respectable scorch protection, particularly when compared with the scorch resistance provided by the same level of stearic acid (Example 11) which was only 5.9 minutes. At lower concentrations Empol 1010 also outperformed stearic acid as a scorch inhibitor. For example, when Empol 1010 and stearic acid were compared at a level of 0.50 phr the Empol 1010 provided T-5 and T-10 values that were over twice as long as those provided by stearic acid (Example 25 and 13).

Table V shows the scorch and cure properties provided by Empol 1052 in Krynac TM 221. Empol 1052 contains 40% dimer acids and 60% trimer and polybasic acids.

TABLE V

| Example | Empol 1052 Used (phr) | Rheometer $M_L$ (N·m) | $M_H$ (N·m) | T'C 90 (Min) | T'C 95 (Min) | Mooney Scorch T-5 (Min) | T-10 (Min) |
|---|---|---|---|---|---|---|---|
| 28 | 0.50 | 9.7 | 94.8 | 7.7 | 16.5 | 13.9 | 18.0 |
| 29 | 1.00 | 9.2 | 91.6 | 10.3 | 19.5 | 17.0 | 21.6 |
| 30 | 3.00 | 8.7 | 89.0 | 10.0 | 20.0 | 16.1 | 20.2 |

Examples 28 through 30 show that Empol 1052 provides the best scorch resistance for carboxylated rubber of all the Empol acids tested. In Example 30, 3 phr of Empol 1052 provides a T-10 value of 20.2 minutes. However, Empol 1052 does increase T'C 95 values.

After making comparisons between Examples 9 through 30 it is very important that Empol acids have an outstanding ability to provide scorch resistance in carboxylated rubbers. Empol 1052 appears to be the best of these Empol acids at provided maximum scorch safety, Empol 1041 appears to be second best, and Empol 1010 is the least effective as a scorch inhibitor. Based on the composition of these Empol acids it is believed that the Mooney scorch protection provided is improved as the molecular weight of the oligomerized fatty acid used increases. Thus, oligomers containing 4 monomer units are better than trimer acids (which contain 3 monomer units) which are better than dimer acids (which contain 2 monomer units) as scorch inhibitors.

As has been previously pointed out, a scorch inhibitor's effect on cure behavior is also an important factor to be taken into consideration when selecting a scorch inhibiting agent. With respect to rheometer T'C 95 the Empol 1041 which is predominately trimer acid is preferred. The cure behavior of the Empol 1010 which is predominantly a dimer acid and Empol 1052 which contains oligomers with 4 monomer units (polybasic acid) is acceptable although not as good as that obtained with Empol 1041. Since Empol 1052 is so outstanding as a scorch inhibiting agent its level in a rubber can be decreased to improve cure rates and it will still provide adequate scorch safety. Taking all things into account oligomerized fatty acids and particularly Empol 1041 are unsurpassed as scorch inhibiting agents for most applications. In order to obtain the desired scorch resistance and cure properties for a particular application various mixtures of oligomers containing 2, 3, and 4 monomer units can be prepared. Generally, it is preferred to use oligomerized fatty acids that are comprised predominantly of trimer acids (90% or more by weight) and minor amounts of dimer acids, polybasic acids and monomeric acids.

EXAMPLE 31

Examples 1 through 30 have involved the addition of oligomerized acids to carboxylated rubbers after coagulation by mixing these acids into the dry rubber utilizing well-known techniques for mixing compounding ingredients into dry carboxylated rubbers (such as, a Banbury or rubber mill mixer). This example shows that it is possible to add these oligomerized acids to the polymer prior to coagulation and to achieve the same benefit.

The carboxylated rubber sample used in this example was prepared by utilizing a polymerization recipe identical to the one employed in Examples 1 through 8 except that a different emulsifier was used. In this example the 2.46 parts of dodecylbenzene sulfonic acid and 0.42 parts of potassium hydroxide used in the emulsifier in Examples 1 through 8 were replaced with 1.0 parts of Empol 1022, 1.5 parts of dodecylbenzene sulfonic acid, 0.5 parts of the sodium salt of a condensed naphthalene sulfonic acid, and 0.45 parts of a 30% by weight aqueous ammonium hydroxide solution.

The polymerization was run at a temperature of 10° C. for 25 hours to a solid content of 27.6%. This latex was degassed to remove unreacted butadiene monomer. Sixty pounds (27.2 kilograms) of this latex and 625 grams of a 25% Agerite Geltrol (a modified high molecular weight hindered phenol antioxidant available from the R. T. Vanderbilt Company, Inc.) emulsion were slowly added to a vigorously agitated solution of 600 pounds (272 kilograms) of water at 60° C., 180 grams of concentrated sulfuric acid, and 150 grams of Nalco TM 108 (Nalco Chemical Company). Nalco TM 108 is a commercially available polyelectrolyte with the structural formula:

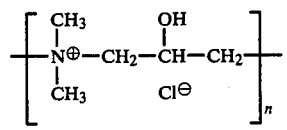

wherein n is an integer varying from about 2 to 15. Nalco TM 108 has a molecular weight ranging from about 200 to about 2000.

Nalco 108 is prepared by reacting epichlorohydrin with dimethylamine. Minor amounts of a compound with the structural formula:

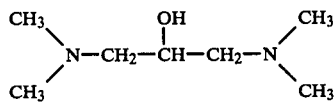

is also believed to be present in Nalco 108. The wet rubber crumb was dewatered and oven dried. The yield was 16.9 pounds (7.7 kilograms) of dried carboxylated rubber. These samples were compounded (using the procedure described for Examples 1 through 8) and tested for scorch and rheometer cure properties as specified in Examples 1 through 8 and 9 through 30, respectively. Excellent Mooney scorch properties were obtained with T-10 found to be 29.8 minute at 121° C. Very satisfactory rheometer cure properties were also obtained with T'C 90 being determined to be 7.0 minutes and T'C 95 being determined to be 13.0 minutes. This example clearly demonstrates the ability of Empol 1022, which is a mixture of dimerized and trimerized fatty acids, to provide scorch resistance in dried carboxylated rubbers when it is added to the latex of the rubber before it is coagulated. It should be noted that the dimer and trimer acids used in this example were saponified by the ammonium hydroxide present in the emulsifier. As has been previously pointed out it is essential that the saponified form of these dimer and trimer acids be maintained in the latex. This was accomplished by maintaining a pH of above 4 in the latex before coagulation. During coagulation the saponified dimer and trimer acids are converted to free acids which will separate from the water phase along with the rubber (the free acids will remain with the rubber).

While certain representative embodiments and details have been shown for the purpose of illustrating this invention, it will be apparent to those skilled in this art that various changes and modifications may be made therein without departing from the scope of this invention.

What is claimed is:

1. An improved scorch resistant carboxylated nitrile rubber composition comprising: a carboxylated nitrile rubber and at least one oligomerized fatty acid which is distributed throughout said carboxylated nitrile rubber to improve the scorch safety of said carboxylated nitrile rubber composition without significantly affecting the cure rate of said carboxylated nitrile rubber composition.

2. An improved scorch resistant carboxylated nitrile rubber composition comprising: a carboxylated nitrile rubber, zinc oxide, and at least one oligomerized fatty acid which is distributed throughout said carboxylated nitrile rubber to improve the scorch safety of said carboxylated nitrile rubber composition without significantly affecting the cure rate of said carboxylated nitrile rubber composition.

3. A carboxylated nitrile rubber composition as specified in claims 1 or 2 wherein said oligomerized fatty acid is at a concentration from about 0.1 to about 7 phr.

4. A carboxylated nitrile rubber composition as specified in claim 3 wherein said oligomerized fatty acid is at a concentration from 0.5 to 3 phr.

5. A carboxylated nitrile rubber composition as specified in claims 1 or 2 wherein said oligomerized fatty acid is comprised predominately of trimer acids.

6. A process for improving the scorch resistance of a carboxylated nitrile rubber composition comprising distributing throughout a carboxylated nitrile rubber at least one oligomerized fatty acid to improve the scorch safety of said carboxylated nitrile rubber composition without significantly affecting the cure rate of said carboxylated nitrile rubber composition.

7. A process for improving the scorch resistance of a carboxylated nitrile rubber composition comprising distributing at least one saponified oligomerized fatty acid throughout a carboxylated nitrile rubber latex which is at a pH of at least 4 and coagulating said latex to separate said carboxylated nitrile rubber composition containing at least one oligomerized fatty acid from an aqueous phase.

8. A process as specified in claim 6 wherein said oligomerized fatty acid is distributed throughout said carboxylated nitrile rubber by mixing it into said carboxylated nitrile rubber utilizing a Banbury mixer.

9. A process as specified in claim 7 wherein a sufficient amount of said oligomerized fatty acid is distributed throughout said latex to attain a concentration of said oligomerized fatty acid in said carboxylated nitrile rubber composition of from about 0.1 to about 7 phr.

10. A process as specified in claim 6 wherein from about 0.1 to about 7 phr of said oligomerized fatty acid is distributed throughout said carboxylated nitrile rubber.

11. A process as specified in claim 9 wherein a sufficient amount of said oligomerized fatty acid is distributed throughout said latex to attain a concentration of said oligomerized fatty acid in said carboxylated nitrile rubber composition of from 0.5 to 3 phr.

12. A process as specified in claim 10 wherein from 0.5 to 3 phr of said oligomerized fatty acid is distributed throughout said carboxylated nitrile rubber.

13. An improved scorch resistant carboxylated nitrile rubber composition comprising: a carboxylated nitrile rubber and at least one saponified oligomerized fatty acid which is distributed throughout said carboxylated nitrile rubber to improve the scorch safety of said carboxylated nitrile rubber composition without significantly affecting the cure rate of said carboxylated nitrile rubber composition.

14. A carboxylated nitrile rubber composition as specified in claim 13 wherein said saponified oligomerized fatty acid is at a concentration from 0.5 to 3 phr.

* * * * *

UNITED STATES PATENT AND TRADEMARK OFFICE
CERTIFICATE OF CORRECTION

PATENT NO. : 4,452,936
DATED : June 5, 1984
INVENTOR(S) : Donald C. Grimm

It is certified that error appears in the above-identified patent and that said Letters Patent is hereby corrected as shown below:

Column 1, line 26, delete "cis-9-Octadecanoic Acid" and substitute --cis-9-Octadecenoic Acid--.

Column 2, line 3, delete "through" and insert --throughout--.

Column 2, line 21, after "linolenic acid" insert -- , and linoleic acid--.

Column 15, line 56, delete "minute" and substitute --minutes--.

Signed and Sealed this

Twelfth Day of February 1985

[SEAL]

Attest:

DONALD J. QUIGG

Attesting Officer     Acting Commissioner of Patents and Trademarks